US008254592B2

(12) United States Patent
Sander et al.

(10) Patent No.: US 8,254,592 B2
(45) Date of Patent: Aug. 28, 2012

(54) ELECTRONIC DEVICE AND EXTERNAL EQUIPMENT WITH CONFIGURABLE AUDIO PATH CIRCUITRY

(75) Inventors: Wendell B. Sander, Los Gatos, CA (US); Jeffrey Terlizzi, San Francisco, CA (US); Douglas M. Farrar, Los Altos, CA (US); Brian Sander, San Jose, CA (US)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 12/481,555

(22) Filed: Jun. 9, 2009

(65) Prior Publication Data

US 2010/0260362 A1 Oct. 14, 2010

Related U.S. Application Data

(60) Provisional application No. 61/168,539, filed on Apr. 10, 2009.

(51) Int. Cl.
*H04R 1/10* (2006.01)
*H04R 25/00* (2006.01)
*H02B 1/00* (2006.01)

(52) U.S. Cl. ........... 381/74; 381/123; 381/375; 381/384

(58) Field of Classification Search .................... 381/91, 381/74, 123, 122, 332, 334, 384, 375, 111
See application file for complete search history.

(56) References Cited

U.S. PATENT DOCUMENTS 3,648,249 A 3/1972 Goldsberry
3,746,991 A 7/1973 Gautney
4,338,846 A 7/1982 Pogoda
4,351,060 A * 9/1982 Treiber ......................... 375/230
5,345,510 A 9/1994 Singhi
5,388,496 A 2/1995 Miller et al.
RE35,536 E 6/1997 Irissou et al.
6,470,197 B1 * 10/2002 Tuoriniemi et al. ....... 455/575.2

(Continued)

FOREIGN PATENT DOCUMENTS

EP 1 976 246 10/2008
WO 9957937 A1 11/1999
WO 03056790 A1 7/2003
WO 2008085929 A2 7/2008

OTHER PUBLICATIONS

Sander et al., U.S. Appl. No. 12/203,881, filed Sep. 3, 2008.

(Continued)

*Primary Examiner* — Vivian Chin
*Assistant Examiner* — Douglas Suthers
(74) *Attorney, Agent, or Firm* — Treys Law Group; G. Victor Treys; David C. Kellogg

(57) ABSTRACT

Electronic devices and accessories such as headsets are provided. An accessory may include speakers and active noise cancellation circuitry. Microphones may be used to pick up ambient noise signals for implementing noise cancellation for the speakers. The accessory may also include a voice microphone and an ambient noise microphone that picks up ambient noise signals for implementing noise cancellation for the voice microphone. A user input interface may gather user input. Ultrasonic tone generators may transmit data between the device and accessory. The electronic device and accessory may be connected to each other by audio connectors. Hybrid circuits that each include a summer and a transconductance amplifier may be selectively switched into or out of use. When switched into use, paths between the device and accessory can support bidirectional communications such as communications involving the simultaneous flow of analog audio and microphone signals in opposite directions.

12 Claims, 11 Drawing Sheets

U.S. PATENT DOCUMENTS

| | | | | |
|---|---|---|---|---|
| 6,745,014 | B1 | 6/2004 | Seibert et al. | |
| 6,988,905 | B2 | 1/2006 | Corey et al. | |
| 7,110,799 | B1 | 9/2006 | Willins et al. | |
| 7,349,546 | B2 | 3/2008 | Ganton | |
| 2001/0053228 | A1* | 12/2001 | Jones | 381/71.6 |
| 2002/0032047 | A1 | 3/2002 | Ingbir | |
| 2005/0190306 | A1 | 9/2005 | Lee | |
| 2005/0201568 | A1* | 9/2005 | Goyal | 381/74 |
| 2006/0009868 | A1 | 1/2006 | Park | |
| 2006/0223581 | A1 | 10/2006 | Jacobs | |
| 2007/0004472 | A1 | 1/2007 | Gitzinger | |
| 2007/0178947 | A1 | 8/2007 | Kim | |
| 2007/0225049 | A1 | 9/2007 | Andrada | |
| 2008/0032753 | A1 | 2/2008 | Nho | |
| 2008/0039072 | A1 | 2/2008 | Bloebaum | |
| 2008/0164994 | A1 | 7/2008 | Johnson et al. | |

OTHER PUBLICATIONS

"TRS connector" Wikipedia, [online], retrieved Jul. 28, 2008, <http://en.wikipedia.org/wiki/TRS_connector>.
Sander et al., U.S. Appl. No. 61/020,988, filed Jan. 14, 2008.
Sander et al., U.S. Appl. No. 12/203,876, filed Sep. 3, 2008.
Sander et al., U.S. Appl. No. 12/203,877, filed Sep. 3, 2008.
Sander et al., U.S. Appl. No. 12/203,879, filed Sep. 3, 2008.
Sander et al., U.S. Appl. No. 12/203,880, filed Sep. 3, 2008.
Sander et al., U.S. Appl. No. 12/203,871, filed Sep. 3, 2008.
Sander et al., U.S. Appl. No. 12/203,883, filed Sep. 3, 2008.
Sander et al., U.S. Appl. No. 12/203,886, filed Sep. 3, 2008.
Sander et al., U.S. Appl. No. 12/203,873, filed Sep. 3, 2008.
Sander et al., U.S. Appl. No. 12/481,556, filed Jun. 9, 2009.

* cited by examiner

ELECTRONIC DEVICE AND EXTERNAL EQUIPMENT WITH CONFIGURABLE AUDIO PATH CIRCUITRY

This application claims the benefit of provisional patent application No. 61/168,539, filed Apr. 10, 2009, which is hereby incorporated by reference herein in its entirety.

BACKGROUND

Electronic devices such as computers, media players, and cellular telephones typically contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used electronic devices such as notebook computers and media players, because audio connectors such as these are relatively compact.

Audio connectors that are commonly used for handling stereo audio have a tip connector, a ring connector, and a sleeve connector and are sometimes referred to as three-contact connectors or TRS connectors. In devices such as cellular telephones, it is often necessary to convey microphone signals from the headset to the cellular telephone. In arrangements in which it is desired to handle both stereo audio signals and microphone signals, an audio connector typically contains an additional ring terminal. Audio connectors such as these have a tip, two rings, and a sleeve and are therefore sometimes referred to as four-contact connectors or TRRS connectors.

In a typical microphone-enabled headset, a bias voltage is applied to the microphone from the electronic device over the microphone line. The microphone in the headset generates a microphone signal when sound is received from the user (i.e., when a user speaks during a telephone call). Microphone amplifier circuitry and analog-to-digital converter circuitry in the cellular telephone can convert microphone signals from the headset into digital signals for subsequent processing.

Some users may wish to operate their cellular telephones or other electronic devices remotely. To accommodate this need, some modern microphone-enabled headsets feature a button. When the button is pressed by the user, the microphone line is shorted to ground. Monitoring circuitry in a cellular telephone to which the headset is connected can detect the momentary grounding of the microphone line and can take appropriate action. In a typical scenario, a button press might be used be used to answer an incoming telephone or might be used skip tracks during playback of a media file.

In conventional arrangements, it can be difficult or impossible to convey desired signals over an audio jack and plug. For example, it may not be possible to route signals from microphones in a headset to an audio circuit in an electronic device to implement noise cancellation functions. As another example, it may not be possible to convey desired signals from an electronic device to an accessory. Problems such as these can arise at least in part because conventional arrangements for coupling cellular telephones to headsets tend to be inflexible.

SUMMARY

Electronic devices and external equipment such as headsets and other accessories may operate in a variety of operating modes. Noise cancellation microphones and ambient noise reduction circuitry may be provided in the external equipment to reduce speaker noise. The external equipment may also include a voice microphone and a noise cancellation microphone that picks up ambient noise signals to reduce voice microphone noise.

Circuitry in the electronic device and external equipment may be adjusted to configure paths associated with a wired link between the electronic device and external equipment. The circuitry may include one or more pairs of hybrid circuits. Each hybrid circuit may contain a summer and a transconductance amplifier. When unidirectional operation is desired to support operations such as the playback of right or left channel audio, the hybrid circuits can be bypassed. When bidirectional operation is desired, the hybrid circuit pairs may be switched into use. When a path is configured for bidirectional operation, analog output signals may be conveyed in one direction while analog input signals may be conveyed in the opposite direction.

The analog output signals that are conveyed over a bidirectional path may include analog right and left channel audio signals. The analog input signals may include microphone signals and ultrasonic tones. The microphone signals may include voice microphone signals and ambient noise signals from a noise cancelling microphone for reducing voice microphone noise. The ultrasonic tones may be used to convey user input from the external equipment to the electronic device. Ultrasonic tone generation techniques may also be used to convey information from the electronic device to the external equipment. This information may be passed over the microphone line or other suitable path in the wired link between the electronic device and the external equipment.

Further features of the invention, its nature and various advantages will be more apparent from the accompanying drawings and the following detailed description of the preferred embodiments.

DETAILED DESCRIPTION

Figure 1:
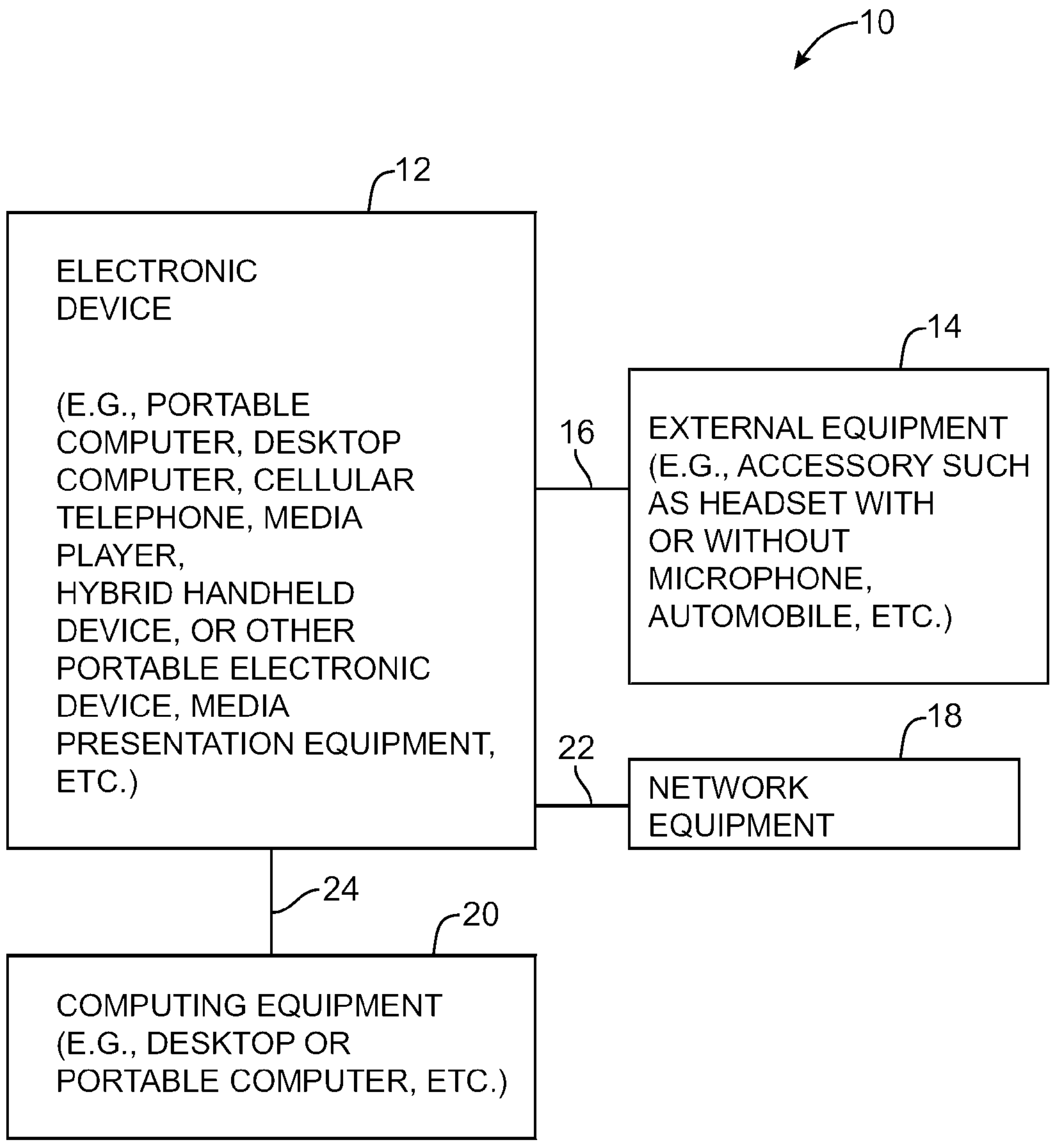
FIG. 1 is a schematic diagram of an illustrative electronic device in communication with an accessory such as a headset or other external equipment in a system in accordance with an embodiment of the present invention.

Electronic components such as electronic devices and other equipment may be interconnected using wired and wireless paths. For example, a wireless path may be used to connect a cellular telephone with a wireless base station. Wired paths may be used to connect electronic devices to equipment such as computer peripherals and audio accessories. As an example, a user may use a wired path to connect a portable music player to a headset.

Electronic devices that may be connected to external equipment using wired paths include desktop computers and portable electronic devices. The portable electronic devices may include laptop computers, tablet computers, and small portable computers of the type that are sometimes referred to as ultraportables. The portable electronic devices may also include somewhat smaller portable electronic devices such as wrist-watch devices, pendant devices, and other wearable and miniature devices.

The electronic devices that are connected to external equipment using wired paths may also be handheld electronic devices such as cellular telephones, media players with wireless communications capabilities, handheld computers (also sometimes called personal digital assistants), remote controllers, global positioning system (GPS) devices, and handheld gaming devices. The electronic devices may be multifunction devices. For example, an electronic device may perform the functions of a cellular telephone and a music player while running additional applications such as email applications, web browser applications, games, etc. These are merely illustrative examples.

An example of external equipment that may be connected to such electronic devices by a wired path is an accessory such as a headset. A headset typically includes a pair of speakers that a user can use to play audio from the electronic device. The accessory may have a user control interface such as one or more buttons. When a user supplies input, the input may be conveyed to the electronic device. As an example, when the user presses a button on the accessory, a corresponding signal may be provided to the electronic device to direct the electronic device to take an appropriate action. Because the button is located on the headset rather than on the electronic device, a user may place the electronic device at a remote location such as on a table or in a pocket, while controlling the device using conveniently located headset buttons.

The external equipment that is connected by the wired path may also include equipment such as a tape adapter. A tape adapter may have an audio plug on one end and a cassette at the other end that slides into a tape deck such as an automobile tape deck. Equipment such as a tape adapter may be used to play music or other audio over the speakers associated with the tape deck. Audio equipment such as the stereo system in a user's home or automobile may also be connected to an electronic device using a wired path. As an example, a user may connect a music player to an automobile sound system using a cable with a three-pin or four-pin audio connector (e.g., TRS or TRRS connectors).

In a typical scenario, the electronic device that is connected to the external equipment with the wired path may produce audio signals. These audio signals may be transmitted to the external equipment in the form of analog audio (as an example). The external equipment may include a microphone. Microphone signals (e.g., analog audio signals corresponding to a user's voice or other sounds) may be conveyed to the electronic device using the wired path. The wired path may also be used to convey other signals such as power signals and control signals. Digital data may be conveyed if desired. The digital data may include, for example, control signals, audio, display information, etc.

If the electronic device is a media player and is in the process of playing a song or other media file for the user, the electronic device may be directed to pause the currently playing media file when the user presses a button associated with attached external equipment. As another example, if the electronic device is a cellular telephone with media player capabilities and the user is listening to a song when an incoming telephone call is received, actuation of a button on an accessory or other external equipment by the user may direct the electronic device to answer the incoming telephone call. Actions such as these may be taken, for example, while the media player or cellular telephone is stowed within a user's pocket.

Accessories such as headsets are typically connected to electronic devices using audio plugs (male audio connectors) and mating audio jacks (female audio connectors). Audio connectors such as these may be provided in a variety of form factors. Most commonly, audio connectors take the form of 3.5 mm (⅛") miniature plugs and jacks. Other sizes are also sometimes used such as 2.5 mm subminiature connectors and ¼ inch connectors. In the context of accessories such as headsets, these audio connectors and their associated cables are generally used to carry analog signals such as audio signals for speakers and microphone signals. Digital connectors such as universal serial bus (USB) and Firewire® (IEEE 1394) connectors may also be used by electronic devices to connect to external equipment such as headsets, but it is often preferred to connect headsets to electronic devices using standard audio connectors such as the 3.5 mm audio connector. Digital connectors such as USB connectors and IEEE 1394 connectors can be of use where large volumes of digital data need to be transferred with external equipment such as when connecting to a peripheral device such as a printer. Optical connectors, which may be integrated with digital and analog connectors, may be used to convey data between an electronic device and an associated accessory, particularly in environments that carry high bandwidth traffic such as video traffic. If desired, audio connectors may include optical communications structures to support this type of traffic.

The audio connectors that may be used in connecting an electrical device to external equipment may have a number of contacts. Stereo audio connectors typically have three contacts. The outermost end of an audio plug is typically referred to as the tip. The innermost portion of the plug is typically referred to as the sleeve. A ring contact lies between the tip and the sleeve. When using this terminology, stereo audio connectors such as these are sometimes referred to as tip-ring-sleeve (TRS) connectors. The sleeve can serve as ground. The tip contact can be used in conjunction with the sleeve to handle a left audio channel and the ring contact can be used in conjunction with the sleeve to handle the right channel of audio (as an example). In four-contact audio connectors an additional ring contact is provided to form a connector of the type that is sometimes referred to as a tip-ring-ring-sleeve (TRRS) connector. Four-contact audio connectors may be used to handle a microphone signal, left and right audio channels, and ground (as an example).

Electrical devices and external equipment may be connected in various ways. For example, a user may connect either a pair of stereo headphones or a headset that contains stereo headphones and a microphone to a cellular telephone audio jack. Electrical devices and external equipment may also be operated in various modes. For example, a cellular telephone may be used in a music player mode to play back stereo audio to a user. When operated in telephone mode, the same cellular telephone may be used to play telephone call left and right audio signals to the user while simultaneously processing telephone call microphone signals from the user. Some headsets may have noise cancellation functionality. When operated in noise cancellation mode, ambient noise signals that are gathered by the headset may be processed locally or may be routed to the electronic device to implement noise reduction.

Electronic devices and external equipment may be provided with path configuration circuitry that allows the electronic devices and external equipment to be operated in a variety of different operating modes in a variety of different combinations. When, for example, a user connects one type of accessory to an electronic device, the path configuration circuitry may be adjusted to form several unidirectional paths between the electronic device and the accessory. When the user connects a different type of accessory to the electronic device or desires to operate the device and accessory in a different mode, the path configuration circuitry may be adjusted to form one or more bidirectional paths in place of one or more of the unidirectional paths. The path configuration circuitry may also be used to configure the wired path between an electronic device and attached external equipment to convey power signals or digital data in place of analog signals such as audio. Combinations of these arrangements may also be used.

An illustrative system in which an electronic device and external equipment with path configuration circuitry may communicate over a wired path is shown in FIG. 1. As shown in FIG. 1, system 10 may include an electronic device such as electronic device 12 and external equipment 14. External equipment 14 may be equipment such as an automobile with a sound system, consumer electronic equipment such as a television or audio receiver with audio capabilities, a peer device (e.g., another electronic device such as device 12), or any other suitable electronic equipment. In a typical scenario, which is sometimes described herein as an example, external equipment 14 may be an accessory such as a headset. External equipment 14 is therefore sometimes referred to as "accessory 14." This is, however, merely illustrative. Accessory 14 may be any suitable electronic equipment if desired.

A path such as path 16 may be used to connect electronic device 12 and accessory 14. In a typical arrangement, path 16 includes one or more audio connectors such as 3.5 mm plugs and jacks or audio connectors of other suitable sizes. Conductive lines in path 16 may be used to convey signals over path 16. There may, in general, be any suitable number of lines in path 16. For example, there may be two, three, four, five, or more than five separate lines. These lines may be part of one or more cables. Cables may include solid wire, stranded wire, shielding, single ground structures, multi-ground structures, twisted pair structures, or any other suitable cabling structures. Extension cord and adapter arrangements may be used as part of path 16 if desired. In an adapter arrangement, some of the features of accessory 14 such as user interface and communications functions may be provided in the form of an adapter accessory with which an auxiliary accessory such as a headset may be connected to device 12.

Accessory 14 may be any suitable equipment or device that works in conjunction with electronic device 12. Examples of accessories include audio devices such as audio devices that contain or work with one or more speakers. Speakers in accessory 14 may be provided as earbuds or as part of a headset or may be provided as a set of stand-alone powered or unpowered speakers (e.g., desktop speakers). Accessory 14 may, if desired, include audio-visual (AV) equipment such as a receiver, amplifier, television or other display, etc. Devices such as these may use path 16 to receive audio signals from device 12. The audio signals may, for example, be provided in the form of analog audio signals that need only be amplified or passed to speakers to be heard by the user of device 12. One or more optional microphones in accessory 14 may pass analog microphone signals to device 12. For example, one microphone may be used to gather voice signals from a user, while one, two, or more than two additional microphones may be used to gather ambient noise signals to implement noise cancellation functions. Buttons or other user interface devices may be used to gather user input for device 12. The use of these and other suitable accessories in system 10 is merely illustrative. In general, any suitable external equipment may be used in system 10 if desired.

Electronic device 12 may be a desktop or notebook computer, a portable electronic device such as a tablet computer or handheld electronic device that has wireless capabilities, equipment such as a television or audio receiver, or any other suitable electronic equipment. Electronic device 12 may be provided in the form of stand-alone equipment (e.g., a handheld device that is carried in the pocket of a user) or may be provided as an embedded system. Examples of systems in which device 12 may be embedded include automobiles, boats, airplanes, homes, security systems, media distribution systems for commercial and home applications, display equipment (e.g., computer monitors and televisions), etc.

Device 12 may communicate with network equipment such as equipment 18 over path 22. Path 22 may be, for example, a cellular telephone wireless path. Equipment 18 may be, for example, a cellular telephone network. Device 12 and network equipment 18 may communicate over path 22 when it is desired to connect device 12 to a cellular telephone network (e.g., to handle voice telephone calls to transfer data over cellular telephone links, etc.).

Device 12 may also communicate with equipment such as computing equipment 20 over path 24. Path 24 may be a wired or wireless path. Computing equipment 20 may be a computer, a set-top box, audio-visual equipment such as a receiver, a disc player or other media player, a game console, a network extender box, or any other suitable equipment.

In a typical scenario, device 12 may be, as an example, a handheld device that has media player and cellular telephone capabilities. Accessory 14 may be a headset with one or more microphones and a user input interface such as a button-based interface for gathering user input. Path 16 may be a four or five conductor audio cable that is connected to devices 12 and 14 using 3.5 mm audio jacks and plugs (as an example). Computing equipment 20 may be a computer with which device 12 communicates (e.g., to synchronize a list of contacts, media files, etc.).

While paths such as path 24 may be based on commonly available digital connectors such as USB or IEEE 1394 connectors, it may be advantageous to use standard audio connectors such as a 3.5 mm audio connector to connect device 12 to accessory 14. Connectors such as these are in wide use for handling audio signals. As a result, many users have a collection of headsets and other accessories that use 3.5 mm audio connectors. The use of audio connectors such as these may therefore be helpful to users who would like to connect their existing audio equipment to device 12. Consider, as an example, a user of a media player device. Media players are well known devices for playing media files such as audio files and video files that contain an audio track. Many owners of media players own one or more headsets that have audio plugs that are compatible with standard audio jacks. It would therefore be helpful to users such as these to provide device 12 with such a compatible audio jack, notwithstanding the potential availability of additional ports such as USB and IEEE 1394 high speed digital data ports for communicating with external devices such as computing equipment 20.

To accommodate different types of headsets and different types of operation, the circuitry in device 12 and accessory 14 may be configurable. For example, electronic device 12 and accessory 14 may include adjustable path configuration circuitry that can be configured to selectively connect different circuit components to the various contacts in the audio connectors as needed.

The path configuration circuitry may be adjusted to support different modes of operation. These different modes of operation may result from different combinations of accessories and electronic devices, scenarios in which different device applications are active, etc. With one suitable configuration, the path configuration circuitry may include hybrid circuits that can be selectively switched into use. When the hybrid circuits are not actively used, the communications line to which they are connected may be used primarily or exclusively for unidirectional analog signal communications (e.g., audio communications). When the hybrid circuits are switched into active use, the same communications line may be used to support bidirectional audio signals or other analog signals (e.g., an outgoing left or right audio channel in one direction and an incoming microphone signal in the opposite direction).

Because unidirectional paths may be selectively converted into bidirectional paths, it is possible to accommodate additional signals over the wired path between electronic device 12 and accessory 14. These additional signals may include power signals (e.g., a power supply voltage that the external equipment provides to electronic device 12 to charge a battery in device 12 or a power supply voltage that device 12 supplies to external equipment 14 to power circuitry such as noise cancellation circuitry), data signals (e.g., analog or digital audio signals or signals for display or control functions), user input signals (e.g., signals from button presses or other user input activity), sensor signals, or other suitable signals.

Figure 2:
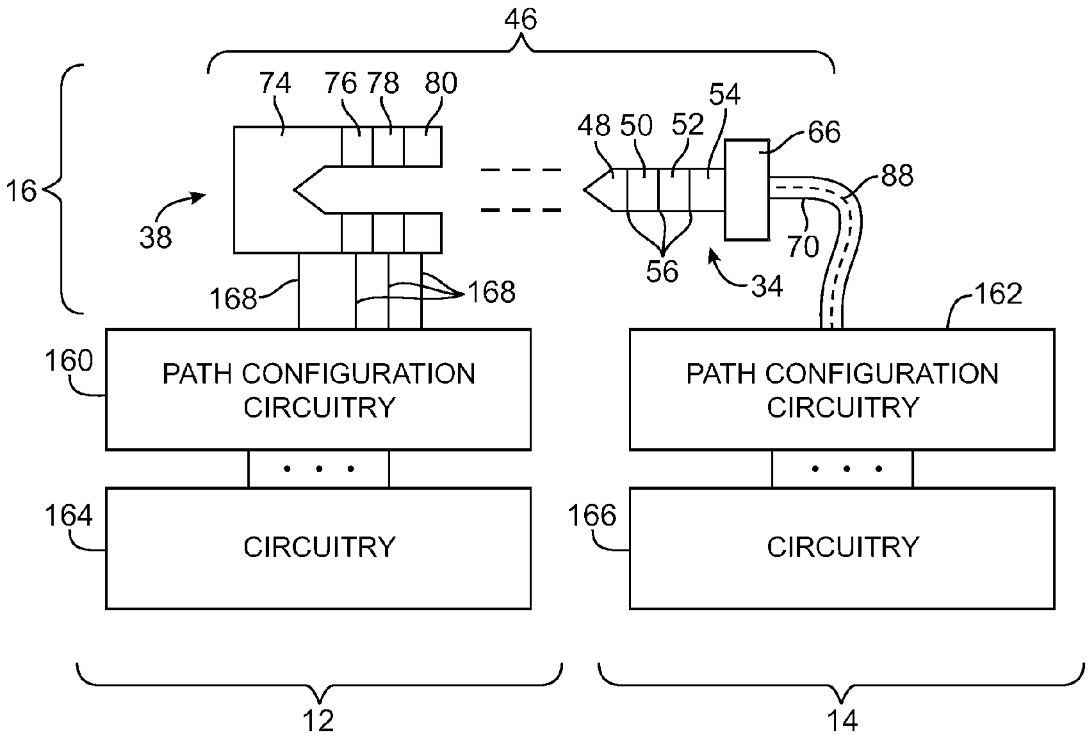
FIG. 2 is a diagram showing how path configuration circuitry may be used in an electronic device and external equipment such as a headset or other accessory to selectively configure how the device and external equipment interact over a communications path that includes an audio connector in accordance with an embodiment of the present invention.

As shown in FIG. 2, path configuration circuitry 160 may be provided in electronic device 12 and path configuration circuitry 162 may be provided in accessory 14 or other external equipment. Wired path 16 may be used to connect electronic device 12 and accessory 14. Path 16 may include audio connectors such as audio connectors 46 and associated conductive lines (e.g., wires).

As shown in FIG. 2, audio connectors 46 may include an audio plug such as plug 34 (i.e., a male audio connector). Plug 34 may mate with a corresponding audio jack such as audio jack 38 (i.e., a female audio connector). Connectors 46 may be used at any suitable location or locations within path 16. For example, audio jacks such as jack 38 can be formed within the housing of device 12 and plugs such as plug 34 can be formed on the end of a cable that is associated with a headset or other accessory 14. As shown in FIG. 2, cable 70 may be connected to audio plug 34 via strain-relief plug structure 66. Structures such as structure 66 may be formed with an external insulator such as plastic (as an example).

Audio plug 34 is an example of a four-contact plug. A four-contact plug has four conductive regions that mate with four corresponding conductive regions in a four-contact jack such as jack 38. As shown in FIG. 2, these regions may include a tip region such as region 48, ring regions such as rings 50 and 52, and a sleeve region such as region 54. These regions surround the cylindrical surface of plug 34 and are separated by insulating regions 56. When plug 34 is inserted in mating jack 38, tip region 48 may make electrical contact with jack tip contact 74, rings 50 and 52 may mate with respective ring regions 76 and 78, and sleeve 54 may make contact with sleeve terminal 80. In a typical configuration, there are four wires in cable 70, each of which is electrically connected to a respective contact.

The signal assignments that are used in audio connectors 46 depend on the type of electronic device and accessory being used. In one typical configuration, ring 52 may serve as ground. Tip 48 and ring 52 may be used together to handle a left audio channel (e.g., signals for a left-hand speaker in a headset). Ring 50 and ring 52 may be used for right channel audio. In accessories that contain microphones, ring 52 and sleeve 54 may, in at least some modes of operation, be used to carry microphone audio signals from the accessory to electronic device 12 (as an example). These signal assignments may be altered to accommodate other types of electronic device and accessories and to accommodate different modes of operation. For example, a line may be configured as a unidirectional audio output line in one mode and as a bidirectional line that conveys analog audio signals such as audio playback and microphone signals in opposite directions in another mode.

Signal assignment adjustments may be made by adjusting path configuration circuitry such as path configuration circuitry 160 and 162. This circuitry may be adjusted using control circuitry in electronic device 12 and accessory 14. As shown in the schematic diagram of FIG. 2, the circuitry of electronic device 12 may include internal components 164 that are connected to path configuration circuitry 160 and the circuitry of accessory 14 may include internal components 166 that are connected to path configuration circuitry 162.

Paths such as conductive lines 168 and corresponding conductive lines 88 may be used to connect each of the audio connector terminals to path configuration circuitry. For example, each contact in connector 38 may be connected to path configuration circuitry 160 by a respective one of lines 168 and each of the contacts in connector 34 may likewise be connected to path configuration circuitry 162 by a respective one of four lines 88 in cable 70.

In audio connector arrangements in which one of lines 168 and an associated line 88 are used to convey microphone signals, the line 168 and the associated line in path 16 that carries the microphone signals (i.e., microphone signals corresponding to the user's voice during a telephone call) may sometimes be referred to as the microphone line. The corresponding contacts in audio connectors 46 are sometimes referred to as microphone contacts or terminals. Other contacts in connectors 46 (e.g., the left and right audio contacts) may also carry microphone signals during certain modes of operation (e.g., during noise cancellation operations in which the microphone signals represent ambient noise measurements), but these contacts are typically referred to as left and right audio contacts, not microphone contacts.

The audio connectors and path configuration circuitry form audio ports on device 12 and accessory 14. For example, conductive lines 88 in cable 70, the associated metal contacts on audio connector 34, and the path configuration circuitry and associated circuitry 166 of accessory 14 form a first audio connector port, whereas the conductive contacts, lines 168, path configuration circuitry 160 and associated circuitry 164 of device 12 form a second audio connector port.

These audio connector ports can be selectively configured using the path configuration circuitry. For example, the microphone path of path 16 and each audio connector port may be selectively configurable between a unidirectional path state in which analog microphone signals are conveyed over the path (without any counter-propagating analog audio signals) and a bidirectional path state in which analog signals are conveyed bidirectionally. In the bidirectional path state, analog microphone signals may be conveyed in one direction while analog audio signals such as played back audio file signals are simultaneously counter-propagated in the opposite direction over the microphone line (as an example). Path 16 may, in general, include any suitable number of reconfigurable lines (e.g., one reconfigurable line, two reconfigurable lines, more than two reconfigurable lines, etc.).

Figure 3:
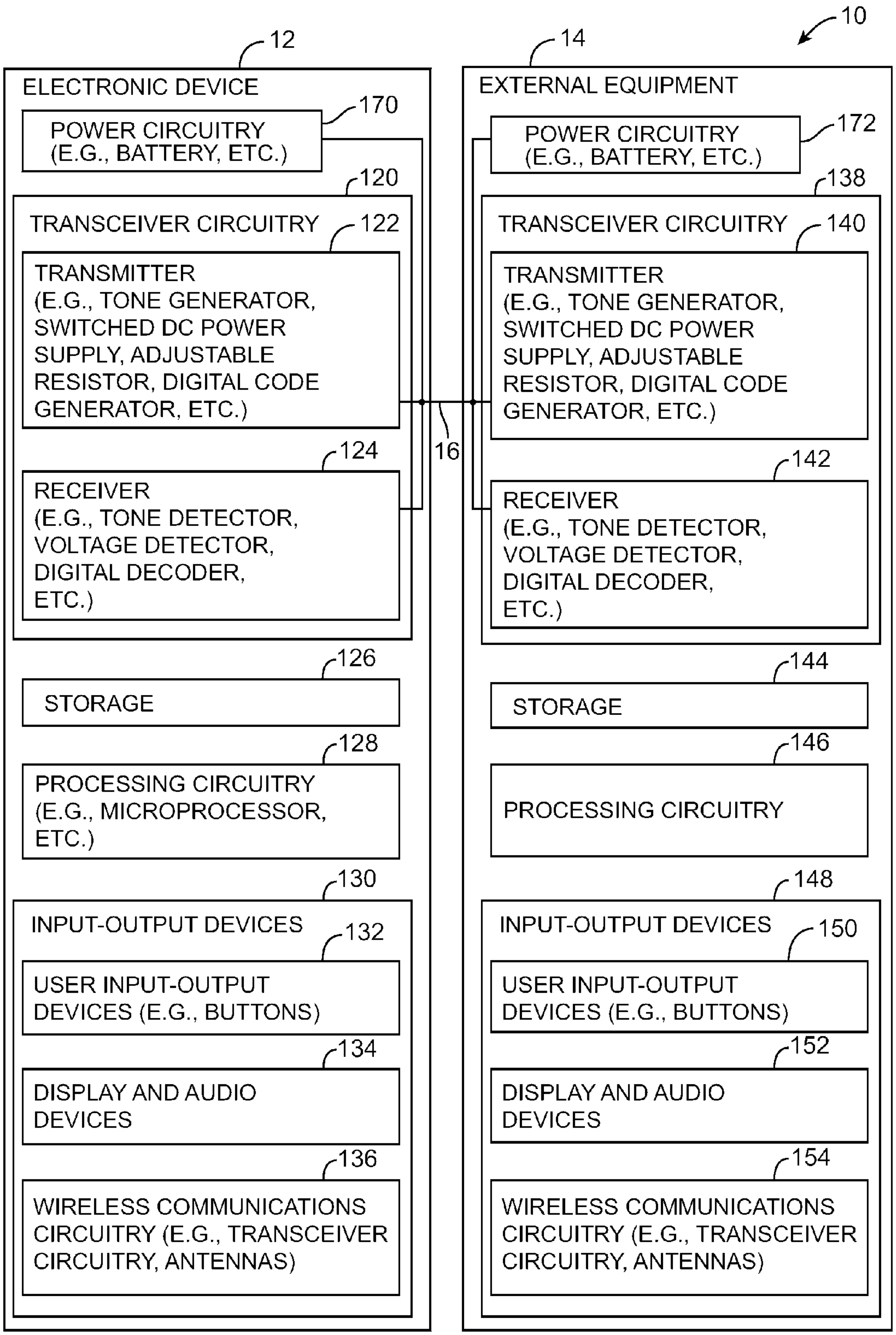
FIG. 3 is a schematic diagram showing illustrative circuitry that may be used in an electronic device and an associated accessory or other external equipment in accordance with an embodiment of the present invention.

A generalized diagram of an illustrative electronic device 12 and accessory 14 is shown in FIG. 3. In the FIG. 3 example, device 12 and accessory 14 are shown as possibly including numerous components for supporting communications and processing functions. If desired, some of these components may be omitted, thereby reducing device cost and complexity. The inclusion of these components in the schematic diagram of FIG. 3 is merely illustrative.

Device 12 may be, for example, a computer or handheld electronic device that supports cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc. Accessory 14 may be, for example, a headset with or without one or more microphones, a set of stand-alone speakers, audio-visual equipment, an adapter (e.g., an adapter such as adapter 112 of FIG. 6), an external controller (e.g., a keypad), a sound system such as an automobile stereo system, or any other suitable external equipment that may be connected to device 12. Path 16 may include audio connectors such as connectors 46 of FIG. 2 or other suitable connectors.

As shown in FIG. 3, device 12 may include power circuitry 170 and accessory 14 may include power circuitry 172. Power circuitry 170 and 172 may include batteries such as rechargeable batteries, power adapter circuitry such as alternating current to direct current converter circuitry, battery charging circuitry, etc.

If desired, power circuitry 172 may supply power to device 12 over path 16 (e.g., to recharge a battery in device 12.). Power circuitry 172 may, for example, be provided as part of the stereo system and other electronic equipment in an automobile. An audio cable may be used to connect device 12 to the automobile stereo system (e.g., using the audio cable to form path 16). When a user plugs device 12 into the automobile's electronics in this way, power circuitry 172 in the automobile may be used to deliver direct current (DC) power to power circuitry 170 in device 12 (e.g., to recharge a battery in device 12 through one of the conductive lines in path 16).

In other arrangements, power may be delivered from device 12 to accessory 14 over one of the lines in path 16. For example, a handheld electronic device battery in circuitry 170 of device 12 may supply power to circuitry 172 and to amplifier circuitry and other circuitry in an accessory 14 such as a headset.

By using path configuration circuitry 160 and 162 of FIG. 2, one or more of the lines in path 16 can be converted to power delivery lines in some situations (e.g., during certain modes of operation and when certain types of components are used) and may be converted to analog audio lines, digital data lines, or other types of lines in other situations. If desired, lines in path 16 may be used to deliver power (e.g., a relatively small amount of microphone bias power or a relatively larger amount of power for operating noise cancellation circuitry) while simultaneously conveying analog or digital signals (e.g., analog audio signals such as voice microphone signals or noise cancellation microphone signals). For example, power may be delivered in one direction while analog or digital signals are conveyed in the opposite direction.

Device 12 and accessory 14 may include storage 126 and 144. Storage 126 and 144 may include one or more different types of storage such as hard disk drive storage, nonvolatile memory (e.g., flash memory or other electrically-programmable-read-only memory), volatile memory (e.g., static or dynamic random-access-memory), etc.

Processing circuitry 128 and 146 may be used with storage 126 and 144 to control the operation of device 12 and accessory 14. Processing circuitry 128 and 146 may be based on processors such as microprocessors and other suitable integrated circuits. These circuits may include application-specific integrated circuits, audio codecs, video codecs, amplifiers, communications interfaces, power management units, power supply circuits, circuits that control the operation of wireless circuitry, radio-frequency amplifiers, digital signal processors, analog-to-digital converters, digital-to-analog converters, or any other suitable circuitry.

With one suitable arrangement, processing circuitry 128 and 146 and storage 126 and 144 are used to run software on device 12 and accessory 14. The complexity of the applications that are implemented depends on the needs of the designer of system 10. For example, the software may support complex functionality such as internet browsing applications, voice-over-internet-protocol (VOIP) telephone call applications, email applications, media playback applications, operating system functions, and less complex functionality such as the functionality involved in encoding button presses as ultrasonic tones.

To support communications over path 16 and to support communications with external equipment such as equipment 18 and 20 of FIG. 1, processing circuitry 128 and 146 and storage 126 and 144 may be used in implementing suitable communications protocols. Communications protocols that may be implemented using processing circuitry 128 and 146 and storage 126 and 144 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, serial and parallel bus protocols, etc. In a typical arrangement, more complex functions such as wireless functions are implemented exclusively or primarily on device 12 rather than accessory 14, but accessory 14 may also be provided with some or all of these capabilities if desired.

Input-output devices 130 and 148 may be used to allow data to be supplied to device 12 and accessory 14 and may be used to allow data to be provided from device 12 and accessory 14 to external destinations. Input-output devices 130 and 148 can include devices such as non-touch displays and touch displays (e.g., based on capacitive touch or resistive touch technologies as examples). Visual information may also be displayed using light-emitting diodes and other lights. Input-output devices 130 and 148 may include one or more buttons. Buttons and button-like devices may include keys, keypads, momentary switches, sliding actuators, rocker switches, click wheels, scrolling controllers, knobs, joysticks, D-pads (direction pads), touch pads, touch sliders, touch buttons, and other suitable user-actuated control interfaces. Input-output devices 130 and 148 may also include microphones, speakers, digital and analog input-output port connectors and associated circuits, cameras, etc. Wireless circuitry in input-output devices 130 and 148 may be used to receive and/or transmit wireless signals.

As shown schematically in FIG. 3, input-output devices 130 may sometimes be categorized as including user input-output devices 132 and 150, display and audio devices 134 and 152, and wireless communications circuitry 136 and 154. A user may, for example, enter user input by supplying commands through user input devices 132 and 150. Display and audio devices 134 and 152 may be used to present visual and sound output to the user. These categories need not be mutually exclusive. For example, a user may supply input using a touch screen that is being used to supply visual output data.

As indicated in FIG. 3, wireless communications circuitry 136 and 154 may include antennas and associated radio-frequency transceiver circuitry. For example, wireless communications circuitry 136 and 154 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

The antenna structures and wireless communications devices of devices 12 and accessory 14 may support communications over any suitable wireless communications bands. For example, wireless communications circuitry 136 and 154 may be used to cover communications frequency bands such as cellular telephone voice and data bands at 850 MHz, 900 MHz, 1800 MHz, 1900 MHz, and 2100 MHz (as examples). Wireless communications circuitry 136 and 154 may also be used to handle the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz.

Although both device 12 and accessory 14 are depicted as containing wireless communications circuitry in the FIG. 3 example, there are situations in which it may be desirable to omit such capabilities from device 12 and/or accessory 14. For example, it may be desired to power accessory 14 solely with a low-capacity battery or solely with power received through path 16 from device 12. In situations such as these, the use of extensive wireless communications circuitry may result in undesirably large amounts of power consumption. For low-power applications and situations in which low cost and weight are of primary concern, it may therefore be desirable to limit accessory 14 to low-power-consumption wireless circuitry (e.g., infrared communications) or to omit wireless circuitry from accessory 14. Moreover, not all devices 12 may require the use of extensive wireless communications capabilities. A hybrid cellular telephone and media player device may benefit from wireless capabilities, but a highly portable media player may not require wireless capabilities and such capabilities may be omitted to conserve cost and weight if desired.

Transceiver circuitry 120 and 138 may be used to support communications between electronic device 12 and accessory 14 over path 16. In general, both device 12 and accessory 14 may include transmitters and receivers. For example, device 12 may include a transmitter that produces signal information that is received by receiver 142 in accessory 14. Similarly, accessory 14 may have a transmitter 140 that produces data that is received by receiver 124 in device 12. If desired, transmitters 122 and 140 may include similar circuitry. For example, both transmitter 122 and transmitter 140 may include ultrasonic tone generation circuitry (as an example). Receivers 124 and 142 may each have corresponding tone detection circuitry. Transmitters 122 and 140 may also each have DC power supply circuitry for creating various bias voltages (which may be constant or which may be varied occasionally to convey information or to serve as a control signals), digital communications circuitry for transmitting digital data, analog signal transmission circuitry, or other suitable transmitter circuitry, whereas receivers 124 and 142 may have corresponding receiver circuitry such as voltage detector circuitry, analog components or receiver circuitry, digital receivers, etc. Symmetric configurations such as these may allow comparable amounts of information to be passed in both directions over link 16, which may be useful when accessory 14 needs to present extensive information to the user through input-output devices 148 or when extensive handshaking operations are desired (e.g., to support advanced security functionality).

It is not, however, generally necessary for both device 12 and accessory 14 to have identical transmitter and receiver circuitry. Device 12 may, for example, be larger than accessory 14 and may have available on-board power in the form of a rechargeable battery, whereas accessory 14 may be unpowered (and receiving power only from device 12) or may have only a small battery (for use alone or in combination with power received from device 12). As another example, accessory 14 may be part of a relatively complex system, whereas device 12 may be formed in a small housing that limits the amount of circuitry that may be used in device 12. In situations such as these, it may be desirable to provide device 12 and accessory 14 with different communications circuitry.

As an example, transmitter 122 in device 12 may include adjustable DC power supply circuitry. By placing different DC voltages on the lines of path 16 at different times, device 12 can communicate relatively modest amounts of data to accessory 14. This data may include, for example, data that instructs accessory 14 to power its microphone (if available) or that instructs accessory 14 to respond with an acknowledgement signal. A voltage detector and associated circuitry in receiver 138 of accessory 14 may process the DC bias voltages that are received from device 12. In this type of scenario, transmitter 140 in accessory 14 may include an ultrasonic tone generator that supplies acknowledgement signals and user input data (e.g., button press data) to device 12. A tone detector in receiver 124 may decode the tone signals for device 12. To support higher data rate transmissions between device 12 and accessory 14, device 12 may include an ultrasonic tone generator in transmitter 122 that transmits ultrasonic tones to a corresponding ultrasonic tone receiver in receiver 142 of accessory 14. If desired, patterns of tones may be transmitted by ultrasonic tone generators in transmitters 122 and 140 (e.g., patterns corresponding to particular commands or other information). These are merely illustrative examples. Device 12 and accessory 14 may include any suitable transceiver circuitry for communicating data using any suitable communications protocol if desired.

Applications running on the processing circuitry of device 12 may use decoded user input data as control signals. As an example, a cellular telephone application may interpret user input as commands to answer or hang up a cellular telephone call, a media playback application may interpret user input as commands to skip a track, to pause, play, fast-forward, or rewind a media file, etc. Still other applications may interpret user button-press data or other user input as commands for making menu selections, etc.

Figure 4:
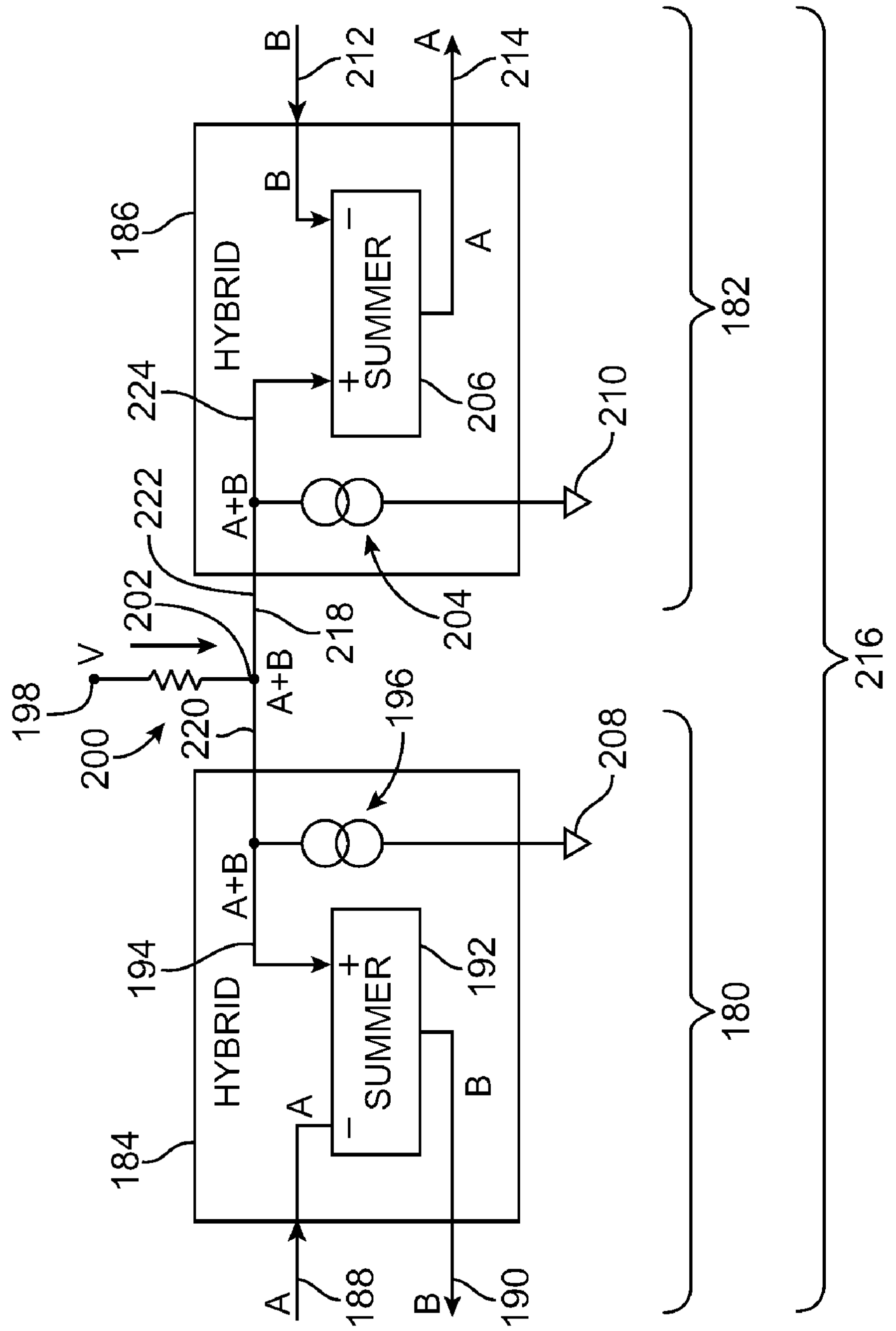
FIG. 4 is a circuit diagram showing how hybrid circuits may be used in a communications path between an electronic device and external equipment in accordance with an embodiment of the present invention.

One illustrative circuit that may be used for one or more of the lines in path 16 is the hybrid circuitry of FIG. 4. Circuitry 216 of FIG. 4 may include circuitry such as circuitry 180 that is located in device 12 and circuitry such as circuitry 182 that is located in accessory 14. Line 218 may be one of the lines in path 16. Node 198 may be provided with a voltage V from a voltage source. Node 198 and resistor 200 may be located in device 12 (e.g., as part of female audio connector port circuitry in device 12) or in accessory 14 (e.g., as part of male audio connector port circuitry in accessory 14). For example, node 198 and resistor 200 may be located in device 12 and may be powered by a microphone bias voltage source in device 12 (as an example). As another example, node 198 may be located in device 12 and resistor 200 may be located in accessory 14.

When configured as shown in FIG. 4, the circuitry of FIG. 4 may support bidirectional communications. The signals that are conveyed over path 218 in FIG. 4 may, for example, be analog signals such as microphone signals or left or right channel audio signals. Signals such as these typically lie in a frequency range of about 20 Hz to 20 kHz. If desired, ultrasonic signals (e.g., tones above 20 kHz in frequency such as 75 kHz to 300 kHz tones) may be conveyed over path 218. Still other signals such as digital pulses or tones or other signals in normal audio frequency ranges may be conveyed if desired.

Circuitry 216 may include hybrid circuits 184 and 186 (sometimes referred to as "hybrids"). Hybrid 184 has input port 188 and output port 190. Common port 220 serves as both an input and an output for hybrid 184. Current source 196 is connected between line 194 and ground 208 and is modulated by the input signal on input 188. Hybrid 186 has input port 212 and output port 214. Common port 222 serves as both an input and an output for hybrid 186. Modulated current source 204 is connected between line 224 and ground 210 and is controlled by the magnitude of the input signal on input 212.

In the example of FIG. 4, hybrid 184 receives an input voltage signal A on input 188 and hybrid 186 receives an input voltage signal B on input 212. In response, a current proportional to A flows through current source 196 and a current proportional to B flows through current source 204. A resulting sum current that is proportional to A+B flows from positive voltage node 198 to node 202 via resistor 200 and produces a voltage that is proportional to the sum of voltages A and B (i.e., the voltage at node 202 is proportional to A+B as shown in FIG. 4). Because the voltage at node 202 is equal to the sum of A and B, a node such as node 202 may sometimes be referred to as a summing node and a resistor such as resistor 200 may sometimes be referred to as a summing resistor. Current sources 196 and 204 are controlled by input voltages and may therefore sometimes be referred to as transconductance amplifiers (i.e., amplifiers that receive input voltages and that produce corresponding output currents).

Hybrid 184 has a summing circuit such as summer 192 with a negative input (−) and a positive input (+). This type of circuit may also be referred to as a differential amplifier circuit, a difference amplifier, a mixer, etc. The negative input of summer 192 receives the signal A from input 188 while the positive input receives the common signal A+B from common input 220. The resulting output of summer 192 is signal B and is provided to output 190. In hybrid 186, the negative input of summer 206 receives voltage A+B while the positive input of summer 206 receives voltage B. A corresponding output voltage A is produced by summer 206 and is routed to output 214, as shown in FIG. 4.

Hybrid circuitry 216 supports bidirectional (full duplex) communications. Device 12 may supply signal A to accessory 14 while accessory 14 simultaneously supplies signal B to device 12. The signals that are transmitted in this way may be, for example, analog audio signals (e.g., analog signals in the audible frequency range of 20 Hz to 20 kHz), ultrasonic tones (e.g., tones at frequencies above 20 kHz that may be used alone or in patterns to represent control data or other signals), digital data, etc. The bias voltage V that is supplied to node 198 may be conveyed over path 222 (e.g., to bias a microphone in accessory 14). In this way, circuitry 216 can simultaneously convey analog audio output (e.g., a left or right channel of audio playback for accessory 14), microphone input (e.g., microphone signals for device 12), and a bias voltage (e.g., to power microphone circuitry in accessory 14).

Figure 5:
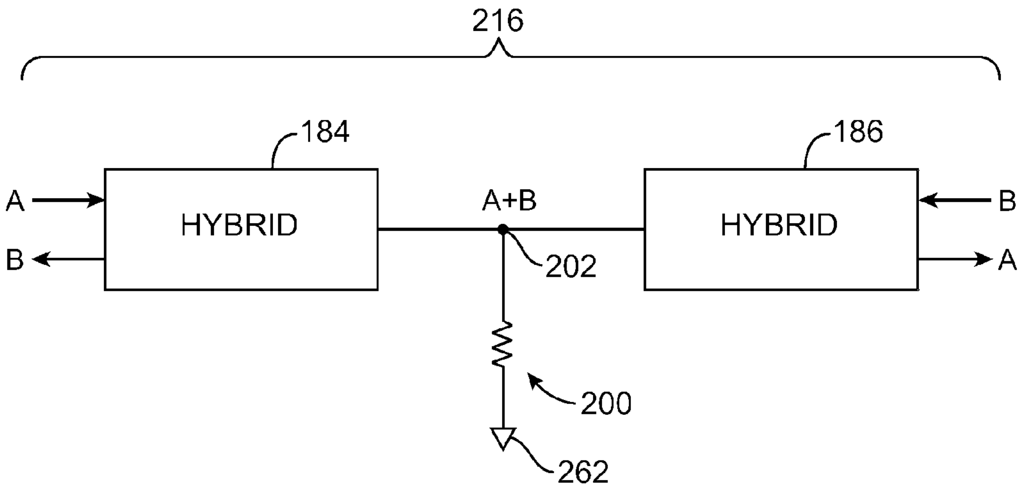
FIG. 5 is a circuit diagram showing how hybrid circuits may be used in a communications path between an electronic device and external equipment in an arrangement in which a summing resistor is shorted to ground in accordance with an embodiment of the present invention.

As shown in FIG. 5, it is not necessary for power supply node 198 in circuitry 216 to be powered by a positive power supply voltage. A negative voltage or ground voltage may be used. For example, power supply node 198 may be connected to ground (e.g., a voltage source at a voltage of 0 volts). Summing node 202 may be connected to ground 262 by summing resistor 200. Summing resistor 200 may be implemented using a resistor in device or a resistor in accessory 14.

Path configuration circuitry in device 12 and accessory 14 may include switches or other configurable circuitry that selectively switches circuitry such as circuitry 216 of FIGS. 4 and 5 into use or out of use as desired. In situations in which the bidirectional nature of path 216 is desired, path configuration circuitry such as path configuration circuitry 160 and 162 may be adjusted to switch hybrids 184 and 186 into use and thereby selectively form a bidirectional path such as hybrid circuit path 216 of FIG. 4 or FIG. 5. In other situations, where only a unidirectional path is desired (e.g., to support microphone input without simultaneous audio output or to support audio output without simultaneous microphone signal input), the path configuration circuitry can be adjusted to switch hybrids 184 and 186 out of use.

Hybrid pairs such as the pair of hybrids of FIG. 4 or the pair of hybrids of FIG. 5 may be included in one of the lines in path 16, in two of the lines in path 16, or in more than two of the lines in path 16.

Figure 6:
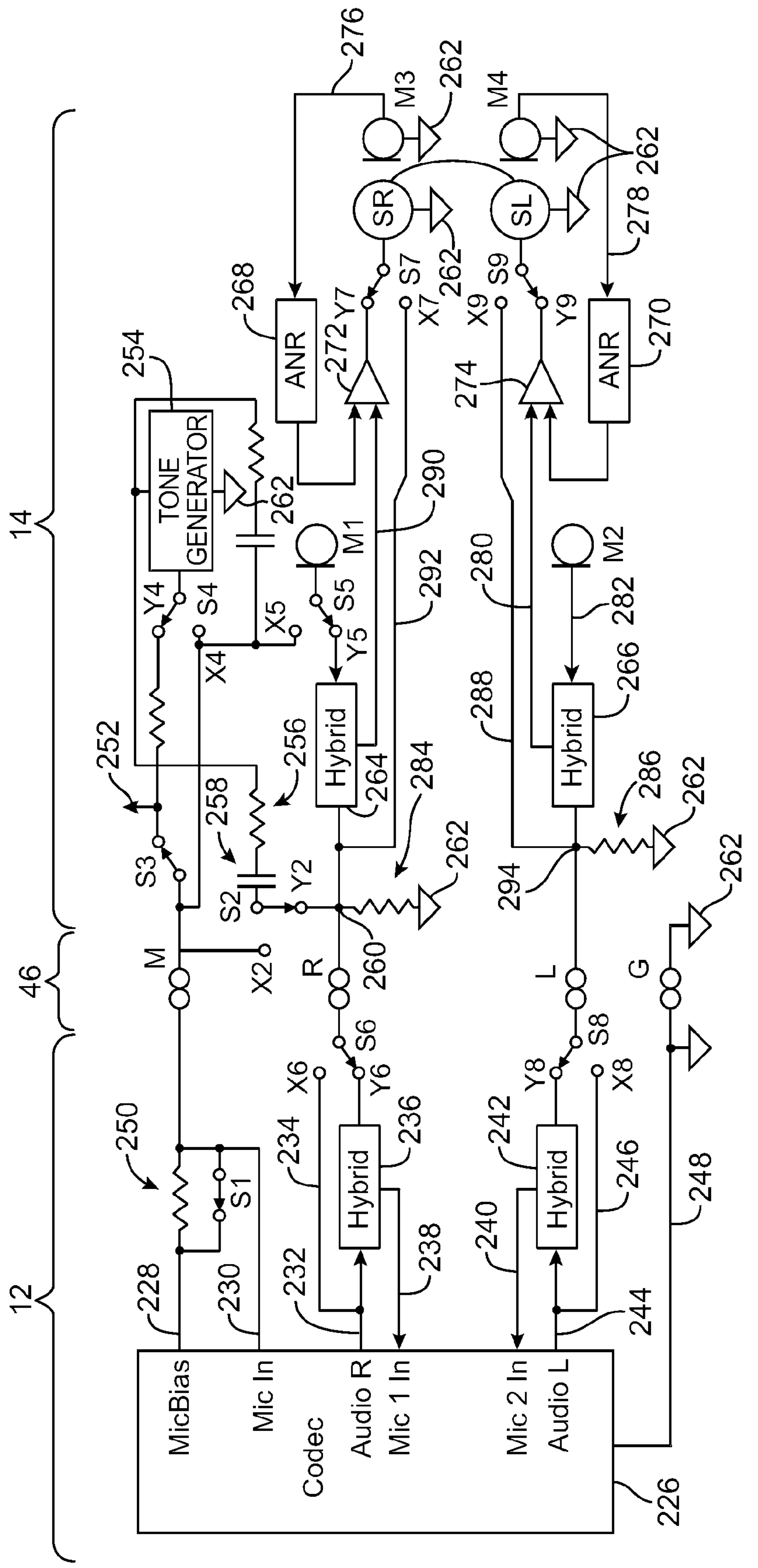
FIG. 6 is a circuit diagram of illustrative path configuration circuitry and associated components in an illustrative electronic device and external equipment such as a headset accessory in accordance with an embodiment of the present invention.

FIG. 6 shows an illustrative circuit configuration in which the left and right audio lines in path 16 have been provided with hybrid pairs. Audio connectors 46 may have four contacts each (i.e., tip, ring, ring, and sleeve contacts in a 3.5 mm connector pair). These contacts and the associated lines in the path between device 12 and equipment 14 are labeled as M (microphone), R (right audio), L (left audio), and G (ground). In the FIG. 6 example, hybrids 236 and 264 form a first hybrid pair and hybrids 242 and 266 form a second hybrid pair. The first hybrid pair can be selectively switched into the right channel (R) audio path when it is desired to make the right channel path bidirectional. When the first hybrid pair is not needed, a bypass path may be switched into use. The second hybrid pair can likewise be selectively switched into the left channel (L) audio path when it is desired to make the left channel path bidirectional. The left channel bypass path can be switched into use to bypass the second hybrid pair when the second hybrid pair is not needed.

The bidirectional paths formed by switching the first and second hybrid pairs into use can be used to convey any suitable signals between device 12 and accessory 14. In the FIG. 6 example, the bidirectional R and L paths are being used to route left and right audio from device 12 to accessory 14 while microphone signals are simultaneously being routed from accessory 14 to device 12. The microphone signals may include, for example, voice microphone signals and noise cancellation microphone signals.

Device 12 may have one or more circuits such as circuit 226. Circuit 226 may include storage and processing circuitry and may be implemented using one or more integrated circuits and other suitable circuit components. With one suitable arrangement, which is sometimes described as an example, circuit 226 may include an audio integrated circuit (sometimes referred to as a codec). Circuit 226 may generate right channel audio output on right channel audio output 232 and can generate left channel audio output on left channel audio output 244.

Audio input can be received at audio inputs 238 and 240. Analog-to-digital converter circuitry in circuit 226 can be used to digitize incoming audio signals. These signals can then be processed by the other storage and processing circuitry in device 12.

With one suitable arrangement, the incoming audio signals on inputs 238 and 240 correspond to microphone signals. Accessory 14 may have microphones such as microphones M1, M2, M3, and M4. Accessory 14 may also have a right-channel speaker such as speaker SR and a left-channel speaker such as speaker SL. Microphones M3 and M4 may be mounted in the vicinity of speakers SR and SL, respectively. In this type of configuration, microphones M3 and M4 may pick up ambient noise in the vicinity of speakers SR and SL and may therefore serve as noise cancelling microphones for speakers SR and SL, respectively. Microphone M1 may be used to monitor the user's voice. Microphone M2 may be used to pick up ambient noise in the vicinity of microphone M1, so that the microphone signals from microphone M2 can be used to reduce noise for microphone M1.

Noise cancellation operations can, in general, be implemented locally in accessory 14 or remotely in device 12. In the FIG. 6 arrangement, local noise reduction for speakers SR and SL can be implemented using signals from noise reduction microphones M3 and M4, whereas remote noise reduction for microphone M1 can be implemented remotely in device 12 (e.g., using the hardware of device 12 such as circuit 226).

Noise cancellation functions for speakers SR and SL can be implemented using active noise reduction circuits 268 and 270. Microphone signals M3, which reflect the amount of ambient noise in the vicinity of speaker SR, may be routed to active noise reduction circuit 268 by path 276. Similarly, signals from microphone M4, which represent ambient noise in the vicinity of speaker SL, may be routed to active noise reduction circuit 270 by path 278. The output of noise reduction circuits 268 and 270 may be routed to differential amplifiers 272 and 274, respectively.

Noise cancellation functions for speakers SR and SL can be switched into use by placing switch S7 in position Y7 and by placing switch S9 in position Y9. Control circuitry in accessory 14 such as storage 144 and processing circuitry 146 of FIG. 3 may be used in controlling the operation of switches in accessory 14. Storage 126 and processing circuitry 128 of FIG. 3 may be used in controlling the operation of switches in device 12.

Audio output signals for right channel audio may be supplied to the input of differential amplifier 272 using path 290. Audio output signals for left channel audio may be supplied to the input of differential amplifier 274 using path 280. With this arrangement, the noise that is picked up by microphone M3 will be removed from the right channel audio signal and the noise that is picked up by microphone M4 will be removed from the left channel audio signal.

Microphone M1 (or M2) may be used as a voice microphone to monitor the user's voice (or other sound) in the vicinity of accessory 14. Microphone M2 may be used for microphone ambient noise cancellation functions (i.e., to reduce the ambient noise component in the voice microphone signal).

Voice microphone noise cancellation functions may be performed locally (e.g., using processing circuitry in accessory 14) or may be performed remotely using circuitry in device 12. In the example of FIG. 6, voice microphone noise cancellation operations are implemented using circuit 226. With this configuration, voice microphone signals from microphone M1 are routed to microphone input 238 by switching hybrids 236 and 264 into use. At the same time, ambient noise signals from microphone M2 may be routed to microphone input 240 by switching hybrids 242 and 266 into use.

To switch these hybrids into use, switch S6 may be placed in position Y6, so that microphone signals can pass through hybrid 236 to reach microphone input 238. Outgoing audio signals from output 232 pass through hybrid 236 and are passed to summing node 260. Switch S5 is placed in position Y5, so that voice microphone signals from microphone M1 may be routed to summing node 260 through hybrid 264. Summing node 260 is coupled to ground 262 through summing resistor 284. While microphone signals are routed from microphone M1 to microphone input 238 over the right channel audio path using switches S6 and S5 and hybrids 236 and 264, audio output signals from right channel audio output 232 may be routed in the opposite direction over the same path. The right channel audio signals from output 232 may be routed to differential amplifier 272 via path 290. The output of differential amplifier 272 (and the right channel audio) can be routed to speaker SR via switch S7 (in position Y7).

The hybrid pair for the left audio channel path may be switched into use by placing switch S8 in position Y8 and by placing switch S9 in position Y9. Summing node 294 may be connected to ground 262 using summing resistor 286. During operation, audio output signals from left channel audio output 244 are routed through hybrid 242, switch S8, hybrid 266, path 280, differential amplifier 274, and switch S9 (in position Y9) to speaker SL. At the same time, ambient noise signals that have been picked up by microphone M2 can be routed to microphone input 240 via path 282, hybrid 266, switch S8 (in position Y8), and hybrid 242.

When the hybrid pairs are both switched into use, voice microphone signals from M1 and associated noise cancellation ambient noise signals from microphone M2 (or other microphone signals from microphone M2) may be routed to circuit 226 for processing. Circuit 226 can implement noise cancellation functions (e.g., subtraction functions in which ambient noise is removed from the voice microphone) using the relatively extensive processing capabilities available in circuit 226, thereby reducing the processing burden on the circuitry of accessory 14.

While microphone signals from M1 and M2 are being conveyed from accessory 14 to device 12, audio signals may be routed over the right and left channel audio lines to speakers SR and SL. The audio signals may be separate left and right channel audio signals or may be a mono signal that has been replicated on both channels. The audio signals may correspond to any suitable content such as a voice in a voice telephone call or a media file in a media playback operation.

The operation of the transconductance amplifiers and summers in the hybrids consumes power. Power can be conserved and high-quality audio playback can be obtained by bypassing the hybrid circuits when bidirectionality is not required. As an example, the hybrids may be bypassed when microphones M1 and M2 are not being used, but audio playback is still desired. Hybrid 236 can be bypassed by placing switch S6 in position X6 so that audio signals are conveyed from path 234 to path 292. Switch S7 can be placed in position X7 to connect speaker SR to path 292 to bypass hybrid 264. Switch S8 may be placed in position X8 to connect path 246 to path 288 and thereby bypass hybrid 242. Switch S9 may be placed in position X9 to connect path 288 to speaker SL, thereby bypassing hybrid 266.

Data such as button press data and other user input can be transmitted from accessory 14 to device 12 using ultrasonic tone generator 254.

In some situations, such as when no noise cancellation functions are required, device 12 can power tone generator 254 using a relatively low amount of power. This power can be used to operate tone generator 254, so that a user can transmit user input to device 12. When noise cancellation functions are switched into use, it is generally desirable to provide accessory 14 with a source of low impedance power for powering the hybrids, difference amplifiers, active noise cancellation circuits, tone generator, and other circuitry of accessory 14. When relatively large amounts of power are desired for powering accessory 14, switch S1 can be closed and a power supply voltage can be supplied to accessory 14 from output 228 of circuit 226.

In low-power modes, resistor 250 (e.g., a 2.2 kilo-ohm resistor) may serve as a load resistor that converts ultrasonic tone current signals from tone generator 254 into voltage signals for detection by circuit 226. Low-power modes can be used when supporting legacy accessories (i.e., accessories without extensive noise cancellation functions or other capabilities that draw larger amounts of power). Lower-power modes can also be used when it is desired to conserve battery power. In this type of situation, voice microphone M1 may be connected to microphone terminal M by switching switch S5 to position X5. Switch S1 may be opened to ensure that resistor 250 is available to convert microphone current signals and ultrasonic tone current signals into voltage signals for processing by circuit 226 at microphone input 230. Switch S2 may be placed in position X2 to ensure that tone signals from tone generator 254 are routed to microphone terminal M through resistor 256 and capacitor 258. Switch S3 may be opened. Switch S4 may be placed in position X4 to route power from microphone line M to ultrasonic tone generator 254.

In higher-power situations such as when noise cancellation is active, resistor 250 may be bypassed by closing switch S1, so that a low-impedance power supply voltage can be supplied to accessory 14 via closed switch S3 and power delivery path 252. Power from path 252 can be routed to noise cancelling circuits and other circuitry in accessory 14. In this configuration, resistor 250 is not available for receiving ultrasonic tones. However, because hybrids 236 and 264 are switched into use, node 260 can serve as a summing node and the right channel line can be used to carry microphone signals. While audio signals are being supplied from output 232, microphone signals from microphone M1 can be routed to node 260 through hybrid 264. At the same time, switch S2 can be placed in position Y2. In this position, ultrasonic tone signals from tone generator 254 can be routed to summing node 260 and therefore input 238 via resistor 256 and capacitor 258. This allows audio output to be provided at the same time that user input ultrasonic tones and microphone signals are being received.

Microphone M2 may be used to provide noise cancellation functions for microphone M1 when microphone M1 is active. If desired, other microphone resources may be used to gather ambient noise signals for use in reducing noise on voice microphone M2. For example, ambient noise signals for reducing noise on microphone M1 may be gathered using microphones M3 or M4. In this type of situation, resources can be conserved by omitting microphone M2.

Figure 7:
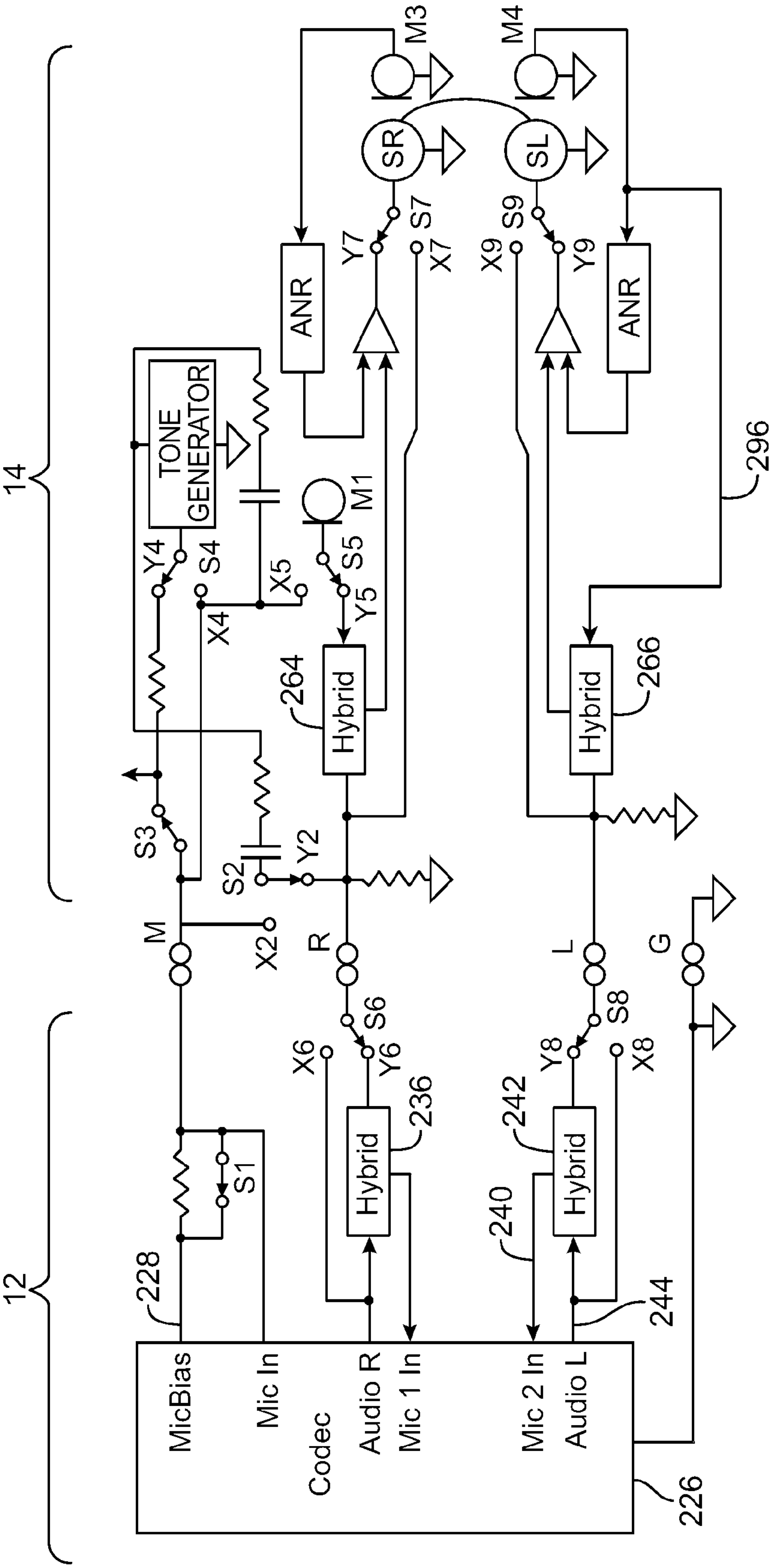
FIG. 7 is a circuit diagram of illustrative path configuration circuitry and associated components of the type shown in FIG. 6 in which one of the accessory microphones has been omitted in accordance with an embodiment of the present invention.

An illustrative configuration for accessory 14 in which microphone M2 has been omitted is shown in FIG. 7. With the arrangement of FIG. 7, hybrid 266 may be bypassed by placing switch S8 in position X8 and by placing switch S9 in position X9 when it is desired to route left channel audio to speaker SL without receiving microphone signals on input 240. When it is desired to route ambient noise signals from microphone M4 to input 240 of circuit 226 (e.g., for implementing noise cancellation for voice microphone M1), switch S8 may be placed in position Y8 and switch S9 may be placed in position Y9 to switch hybrids 242 and 266 into use. When hybrids 242 and 266 are switched into use, left channel audio signals can be routed from output to speaker SL, while microphone signals from microphone M4 are simultaneously routed to input 240 of circuit 226 via path 296 and hybrids 266 and 242.

Figure 8:
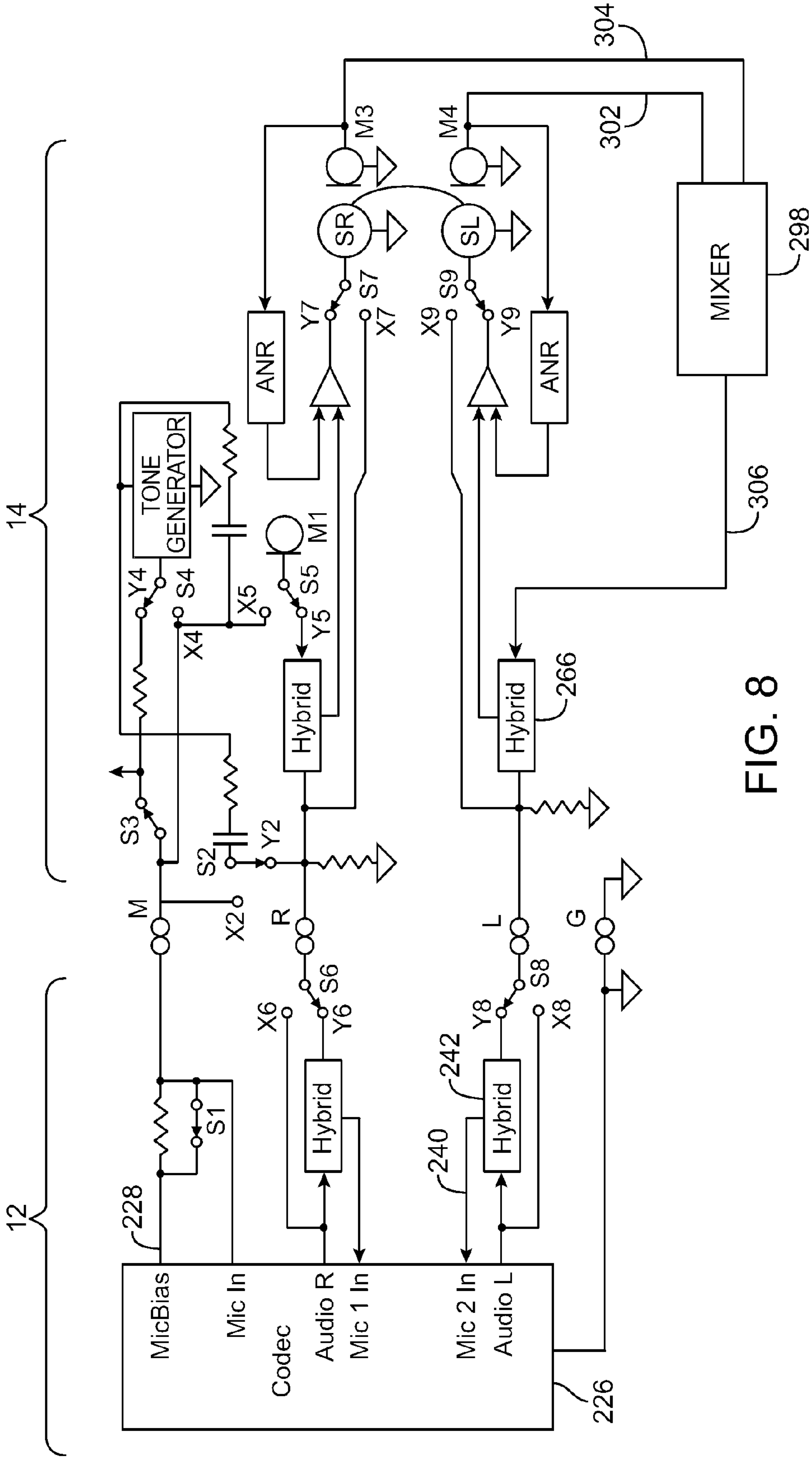
FIG. 8 is a circuit diagram of illustrative path configuration circuitry and associated components in a system in which microphone signals from multiple microphones in an accessory are combined using a mixer in accordance with an embodiment of the present invention.

Signals from multiple microphones can be combined. For example, ambient noise signals for implementing noise cancellation on microphone M1 may be picked up using both microphone M3 and microphone M4. As shown in FIG. 8, a mixer such as mixer 298 may have a first input such as input 302 that receives microphone signals from microphone M4 and may have a second input such as input 304 that receives microphone signals from microphone M3. The microphone signals from microphones M3 and M4 may be combined using mixer 298 and a corresponding mixed microphone signal output may be supplied to mixer output path 306. The microphone signals on path 306 may be conveyed to microphone input 240 of circuit 226 in device 12 for use in implementing noise cancellation for voice microphone M1 (as an example).

It may be desirable to transmit data from device 12 to accessory 14. For example, it may be desirable to send relatively low-data-rate signals from device 12 to accessory 14 by periodically varying the level of direct-current (DC) voltage that is supplied at output 228. These fluctuations (which may occur over fractions of seconds, seconds, or longer) may be decoded by accessory 14. Decoded data of this type may be used as part of a communications protocol (e.g., for implementing handshaking, as part of a resource discovery scheme, etc.). Decoded data of this type may also be used as control signals (e.g., to adjust the mode of operation of accessory 14) or to display information on accessory 14 (e.g., a currently playing music file title).

Figure 9:
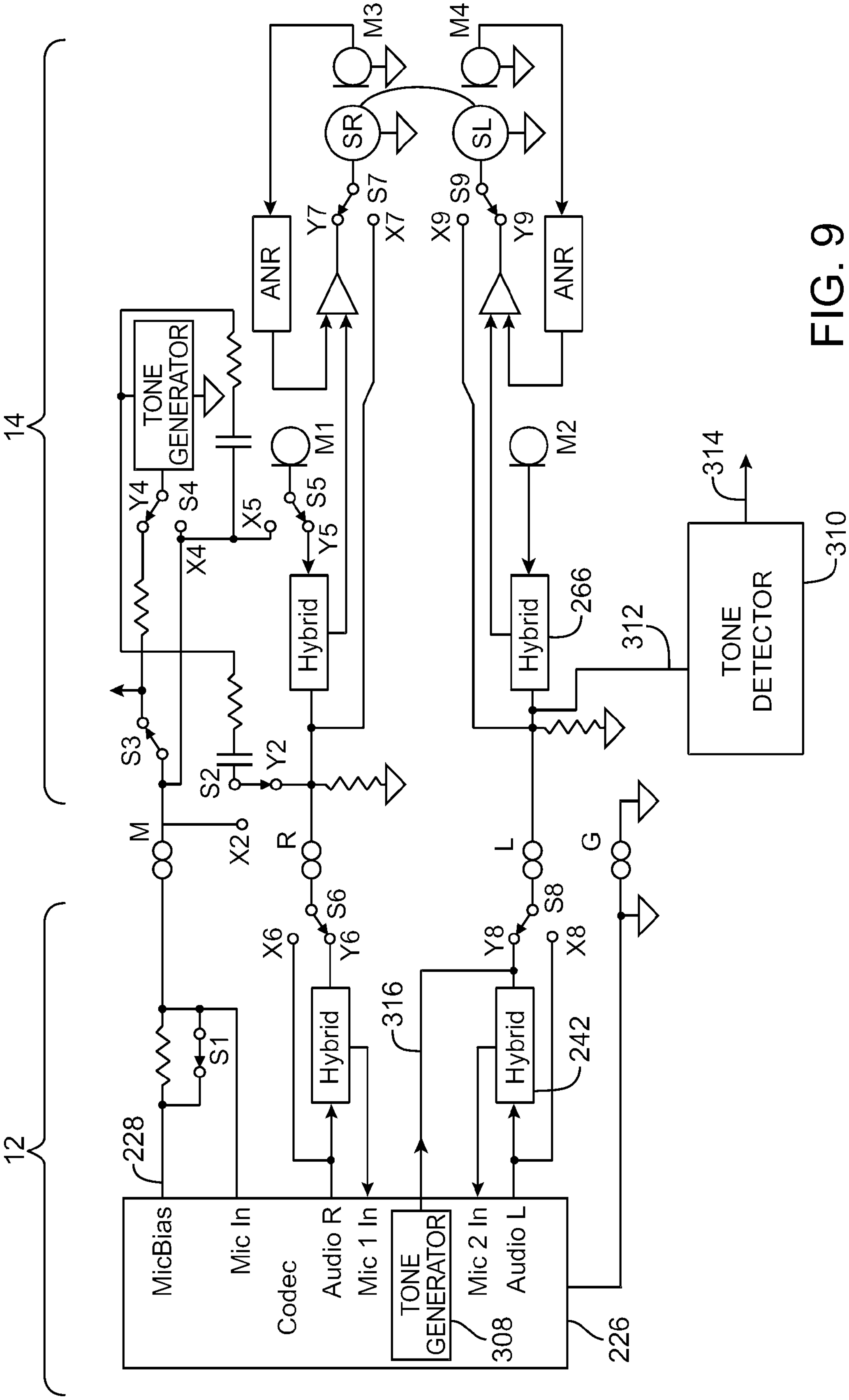
FIG. 9 is a circuit diagram of illustrative path configuration circuitry and associated components in a system in which a tone generator in an electronic device transmits signals to a tone receiver in an accessory over an audio line such as a left or right audio channel line in accordance with an embodiment of the present invention.

If desired, device 12 may be provided with more robust data transmission capabilities. For example, device 12 may be provided with a data transmitter such as ultrasonic tone generator 308 of FIG. 9. Tone generator 308 may transmit ultrasonic tones that are routed to a corresponding ultrasonic tone receiver such as tone detector 310 in accessory 14 using path 316 and path 312. Tone receiver 310 may receive and decode received tone signals and may provide corresponding output signals on output 314. These decoded signals may include any suitable type of data such as data involved with implementing a communications protocol (e.g., handshaking data or resource discovery data), control signals (e.g., to adjust the mode of accessory 14), data to be displayed using accessory 14 (e.g., visual data to be displayed on a display in accessory 14 and/or audio data to be played back for a user of accessory 14, etc.). Tone generator 308 may be able to support data rates that are larger than the data rates available when using a modulated DC-voltage scheme implemented on output 228. Tone generator 308 may also be connected to the input of hybrid 242, so that both audio and ultrasonic tones above normal audio frequency ranges can be supplied to accessory 14 through the hybrids in the left channel audio path if desired. Other arrangements may also be used (e.g., configurations in which tone generator 308 and tone receiver 310 communicate over other lines in the path between device 12 and accessory 14).

Figure 10:
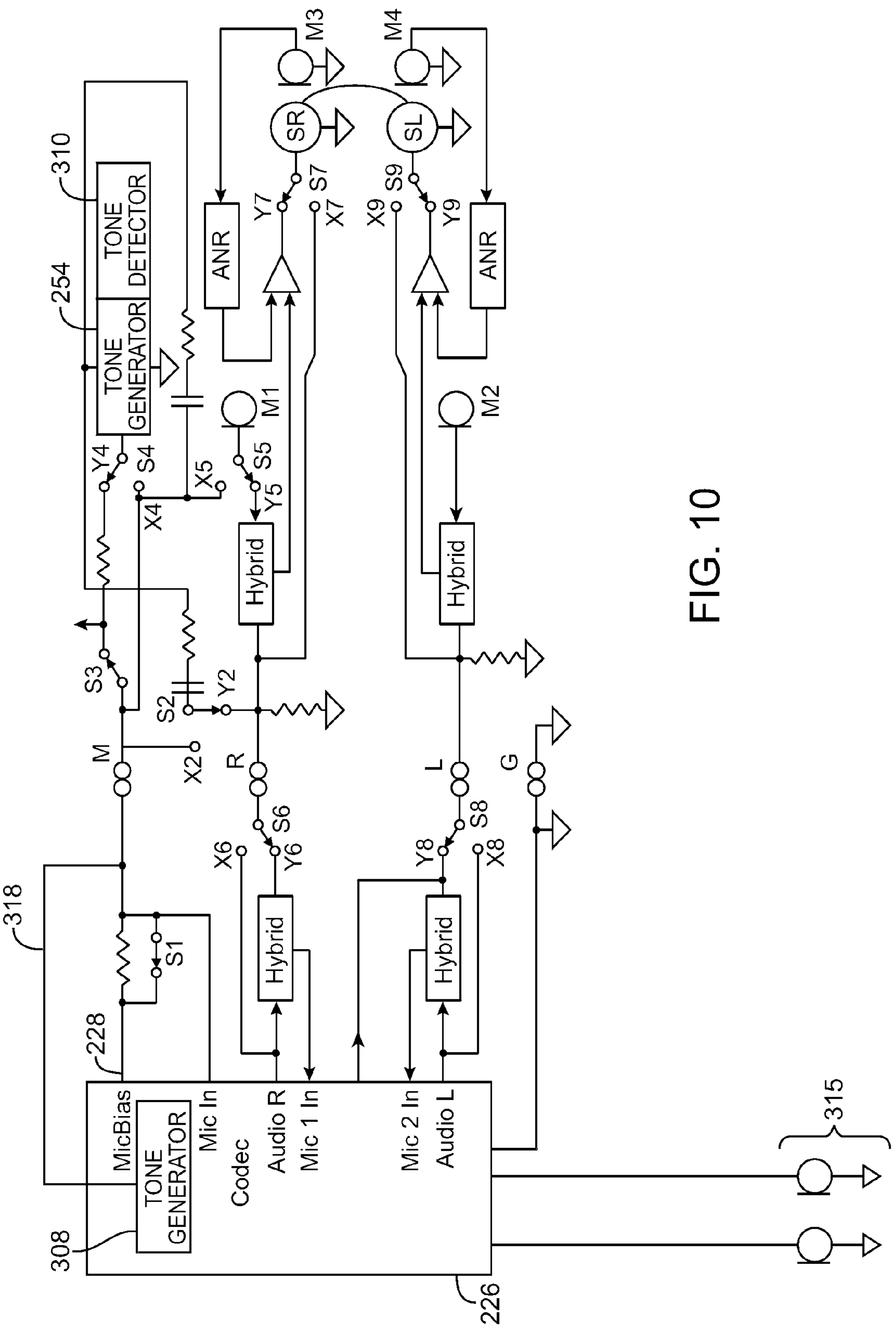
FIG. 10 is a circuit diagram of illustrative path configuration circuitry and associated components in a system in which a tone generator in an electronic device transmits signals to a tone receiver in an accessory over a microphone line in accordance with an embodiment of the present invention.

As shown in FIG. 10, for example, tone generator 308 may be coupled to microphone line M using path 318. Using this type of arrangement, tone generator 308 may send ultrasonic tones over microphone line M that are received by tone detector 310. As the same time, ultrasonic tone generator 254 may send ultrasonic tones to tone detector circuitry in circuit 226. When microphone line M is used to route ultrasonic tones from tone generator 308 to accessory 14, data can be conveyed to accessory 14 in an uninterrupted fashion, even if the hybrid pairs in the left and right audio lines are being bypassed (e.g., because the user has placed device 12 and accessory 14 in a hybrid bypass mode to enhance audio quality).

FIG. 10 also shows how device 12 may be provided with one or more optional microphones 315. These microphones may provide microphone signals to circuit 226 (e.g., to an audio codec, a separate digital-signal-processing (DSP) integrated circuit, or other circuitry that can digitize and process analog microphone signals). Microphone signals from microphones 315 may be used to gather voice signals, to gather ambient noise signals for implementing noise cancellation functions for device 12 or the microphones or speakers in accessory 14, or to gather any other suitable audio information.

Figure 11:
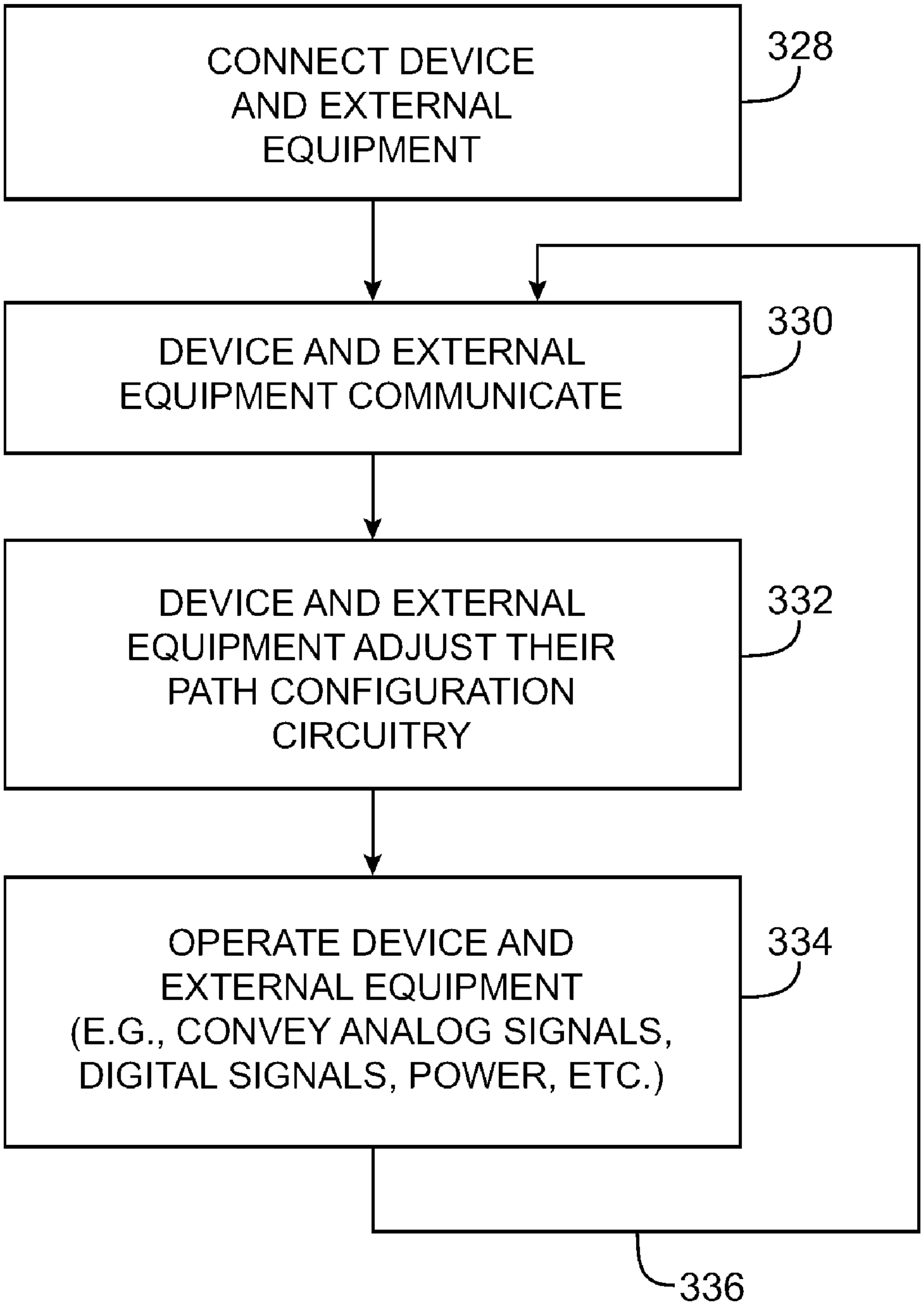
FIG. 11 is a flow chart of illustrative steps involved in operating an electronic device and external equipment with path configuration circuitry in accordance with an embodiment of the present invention.

Illustrative steps involved in operating device 12 and an accessory or other equipment 14 are shown in FIG. 11. Equipment 14 may be a headset or any other suitable equipment that is external to device 12.

At step 328, device 12 may be connected to external equipment 14 by wired communications path 16. Wired communications path 16 may contain conductive lines such as a conductive microphone line, conductive left and right channel audio lines, and a ground line. Audio connectors such as jacks and plugs may be used. For example, device 12 may have a female audio connector with tip, ring, ring, and sleeve contacts connected to respective lines in the wired connector, whereas external equipment 14 may have corresponding audio connector contacts connected to the same lines.

At step 330, device 12 and external equipment 14 may communicate to share configuration information. For example, device 12 may inform equipment 14 of the capabilities and operating mode requirements for device 12. Similarly, external equipment 14 may inform device 12 of which functions are available in equipment 14. These communications may be performed using one or more DC voltages, analog transmissions (e.g., ultrasonic tone codes transmitted using tone generators 308 and 254), digital communications, etc.

At step 332, device 12 and external equipment 14 may adjust their internal circuitry accordingly. This configures the switches and other circuits in device 12 and external equipment 14 so that hybrids are switched into use or out of use as appropriate and so that signals such as analog audio signals, digital signals, and power signals are routed appropriately through the lines of wired path. These signals may be conveyed using unidirectional lines and bidirectional lines (e.g., lines for which hybrids have been switched into use). The number of unidirectional and bidirectional lines may be adjusted by adjusting the circuitry of device 12 and external equipment 14 during step 332.

After placing the circuitry of device 12 and external equipment 14 in appropriate operating modes to accommodate desired signals over path 16, device 12 and external equipment 14 can be operated normally (step 334). During operation, changes to the functions of device 12 and/or external equipment 14 may dictate that further path configuration adjustments be made. In this situation, processing can loop back to step 330, as indicated by line 336.

The foregoing is merely illustrative of the principles of this invention and various modifications can be made by those skilled in the art without departing from the scope and spirit of the invention.

What is claimed is:

1. An accessory, comprising:

an audio connector having a microphone contact, a right channel audio contact, a left channel audio contact, and a ground contact;

a first hybrid circuit connected to the left channel audio contact;

a second hybrid circuit connected to the right audio contact;

a speaker that receives audio signals through one of the hybrid circuits;

a microphone that picks up ambient noise signals;

active noise cancellation circuitry that is coupled to the speaker and the microphone and that reduces noise in the speaker using the ambient noise signals;

a voice microphone that picks up voice signals that are conveyed through the audio connector; and a power supply terminal that receives power for the active noise cancellation circuitry from the audio connector.

2. The accessory defined in claim 1 further comprising an ultrasonic tone detector connected to the audio connector.

3. The accessory defined in claim 2 wherein the ultrasonic tone detector is connected to a selected one of: the left channel audio contact and the right channel audio contact.

4. The accessory defined in claim 1 further comprising a switch that is coupled between the power supply terminal and the microphone contact.

5. The accessory defined in claim 1 further comprising at least two additional microphones.

6. The accessory defined in claim 1 further comprising two additional microphones, wherein each hybrid circuit includes:

a summer;

a transconductance amplifier;

an input port;

an output port; and a common port, wherein the input port of at least one of the hybrid circuits receives a noise cancellation signal directly from the one of the two additional microphones.

7. A headset comprising:

an audio connector having a microphone contact, a left channel audio contact, a right channel audio contact, and a ground contact;

a left channel speaker that receives left channel audio signals through the left channel audio contact;

a right channel speaker that receives right channel audio signals through the right channel audio contact;

a left channel microphone that detects left channel ambient noise signals to reduce noise in the left channel speaker;

a right channel microphone that detects right audio channel ambient noise signals to reduce noise in the right channel speaker; and at least one hybrid circuit that is coupled to one of the audio contacts in the audio connector and that has a summer and a transconductance amplifier, wherein the hybrid circuit conveys ambient noise signals from one of the microphones to one of the contacts in the audio connector.

8. The headset defined in claim 7 further comprising a voice microphone that supplies voice microphone signals to at least the microphone contact.

9. The headset defined in claim 8 further comprising:

an additional hybrid circuit that is coupled to another one of the audio contacts in the audio connector; and switching circuitry that is configured to route the voice microphone signals through the additional hybrid circuit.

10. The headset defined in claim 7 further comprising a mixer that mixes signals from the left channel microphone and the right channel microphone, wherein the mixer has an output that is connected to an input port on the hybrid circuit.

11. The headset defined in claim 7 further comprising at least one additional hybrid circuit that is connected to another one of the contacts in the audio connector.

12. A headset comprising:

an audio connector having a microphone contact, a left channel audio contact, a right channel audio contact, and a ground contact;

a left channel speaker that receives left channel audio signals through the left channel audio contact;

a right channel speaker that receives right channel audio signals through the right channel audio contact;

a left channel microphone that detects left channel ambient noise signals to reduce noise in the left channel speaker;

a right channel microphone that detects right audio channel ambient noise signals to reduce noise in the right channel speaker;

at least one hybrid circuit that is coupled to one of the audio contacts in the audio connector and that has a summer and a transconductance amplifier, wherein the hybrid circuit conveys ambient noise signals from one of the microphones to one of the contacts in the audio connector; and an ultrasonic tone generator that is coupled to the microphone contact.

* * * * *